United States Patent [19]

Lambertus

[11] Patent Number: 4,934,916
[45] Date of Patent: Jun. 19, 1990

[54] PERFORATED PLATE FOR THE UNDERWATER GRANULATING OF PLASTIC STRANDS

[75] Inventor: Friedrich Lambertus, Stuttgart, Fed. Rep. of Germany

[73] Assignee: Werner & Pfleiderer GmbH, Stuttgart, Fed. Rep. of Germany

[21] Appl. No.: 317,300

[22] Filed: Mar. 1, 1989

[30] Foreign Application Priority Data

Mar. 23, 1988 [DE] Fed. Rep. of Germany ....... 3809735

[51] Int. Cl.⁵ .............................................. B29C 47/12
[52] U.S. Cl. ...................................... 425/67; 264/142; 425/311; 425/463; 425/464; 425/DIG. 230
[58] Field of Search ............. 425/311, 464, DIG. 230, 425/67, 313, 382 R, 463, 310, 378.1; 264/142, 178 R

[56] References Cited

U.S. PATENT DOCUMENTS

| Re. 25,972 | 3/1966 | Knoth | 425/DIG. 230 |
|---|---|---|---|
| 1,909,228 | 5/1933 | Sizer | 425/DIG. 230 |
| 2,902,949 | 9/1959 | Meakin | 425/DIG. 230 |
| 3,340,572 | 9/1967 | Lurie | 425/464 |
| 3,427,685 | 2/1969 | Gove et al. | 425/464 |
| 3,620,883 | 11/1971 | Nalle | 425/464 |
| 3,749,536 | 7/1973 | Remscheid et al. | 425/464 |
| 3,857,665 | 12/1974 | Kennedy | 425/464 |
| 3,957,565 | 5/1976 | Livingston et al. | 425/464 |
| 4,010,229 | 3/1977 | Pleska et al. | 264/140 |
| 4,187,067 | 2/1980 | Mizuno et al. | 425/464 |
| 4,242,075 | 12/1980 | Higuchi et al. | 425/464 |
| 4,678,423 | 7/1987 | Bertolotti | 425/464 |

FOREIGN PATENT DOCUMENTS 3420944  2/1985  Fed. Rep. of Germany ...... 425/464

Primary Examiner—Jay H. Woo
Assistant Examiner—James P. Mackey
Attorney, Agent, or Firm—Ladas & Parry

[57] ABSTRACT

A perforated granulating plate construction in which conically tapering inlet channels are connected to several outlet channels, the collective cross-sectional area of the outlet channels being substantially equal to the cross-sectional area at the outlet of the associated inlet channel. The outlet channels form an angle of inclination with respect to the longitudinal axis of the associated inlet channel and the discharge outlets of the outlet channels are arranged in a plane about an axis of symmetry which is coincident with the longitudinal axis of the inlet channel.

15 Claims, 4 Drawing Sheets

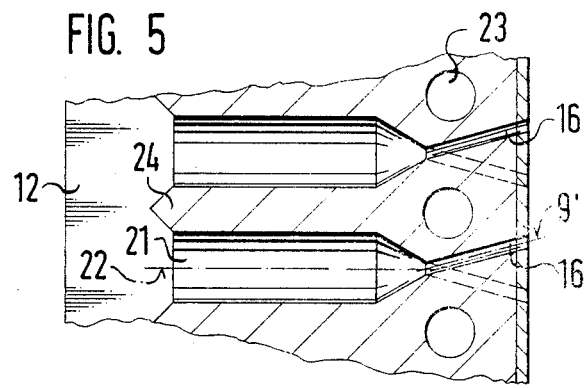
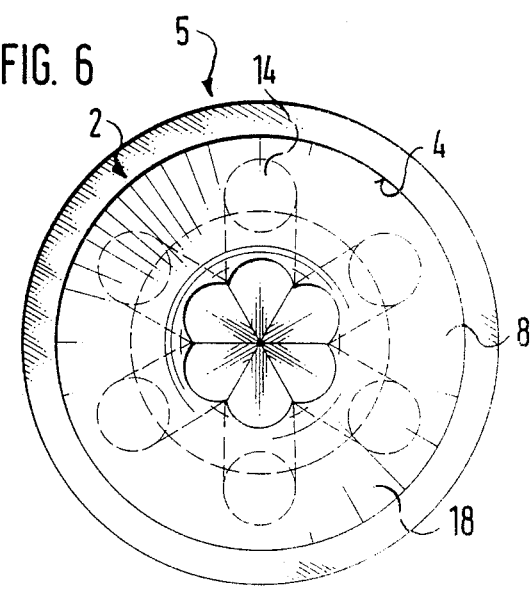

PERFORATED PLATE FOR THE UNDERWATER GRANULATING OF PLASTIC STRANDS

FIELD OF THE INVENTION

The present invention relates to a perforated plate construction for the underwater granulating of plastic strands.

More particularly, the invention relates to a perforated plate construction in which a perforated plate is provided with outlet channels for discharge of strands of plastic melt fed from conical inlet channels and the strands of plastic melt are heated before being charged.

BACKGROUND

It is known to limit the length of the outlet channels to a minimum, both for thermal reasons and in order to maintain a small pressure drop. The flow of the melt to the outlet channels takes place individually through conical sections in order to permit a uniform flow of the melt.

One disadvantage of this arrangement is that, because of the conical inlet sections, the number of outlet channels in the perforated plate is limited by the finite area of the inlet sections. The required stability of the perforated plate in the critical outlet region of the outlet channels which is subjected to thermal stresses also establishes technical limits.

U.S. Pat. No. 3,427,685 discloses a perforated plate in which, starting from a distributor channel, conically tapering inlet channels open into the outlet channels. The outlet channels are present only in limited number since each outlet channel is supplied by a separate inlet channel. The individual bores forming the outlet channels extend substantially over the entire width of the perforated plate and furthermore impair the quality of the product due to the pressure drop which is produced.

In another perforated plate construction shown in U.S. Pat. No. 3,857,665, pocket-shaped inlet channels are provided, each inlet channel opening into two flow channels of relatively short length. A disadvantage of this perforated plate construction is that disturbances in inflow occur in the region of the outlet channels at the bottom of the pocket, these disturbances being further increased by the formation of a bridge at the inlet pocket. When a large number of outlet channels is provided, the locally dense arrangement of adjacent outlet channels furthermore decreases the stability at the front surface of the perforated plate which is subjected to a high thermal load.

DE-OS 34 20 944 shows a perforated plate for the underwater granulating of plastics in which, for reducing the extrusion pressure and increasing the density of the outlet channels a primary hole of large diameter is provided from which several outlet channels extend parallel to the longitudinal axis of the hole. This construction has the disadvantage that the change in cross-section in the transfer region from the primary hole to the outlet channels results in a non-uniform feed of the melt, which impairs the quality of the product. The stability at the front surface of the perforated plate is also reduced by the provision of a plurality of outlet openings of the outlet channels which are separated from each other by only relatively thin and short webs.

SUMMARY OF THE INVENTION

The invention proceeds from the discovery that in order to obtain optimal conditions of pressure and flow within the perforated plate, a large number of outlet channels associated with a smaller number of inlet channels is desirable, limits, however, being established structurally on this arrangement with regard to the strength of the perforated plate based on the necessary supply of heat.

An object of the present invention, therefore, is to provide a perforated plate construction which, with due consideration of optimal melt, inflow and outlet conditions, has sufficient strength in the outlet region of the melt strands.

This and other objects of the invention are obtained by the provision of a plurality of inlet channels for supply of plastic material thereto and a plurality of outlet channels from which strands of the plastic material can be discharged from the plate for underwater granulation, the inlet channels being surrounded by heat exchange means for effecting heat exchange with the plastic material flowing therein, each inlet channel being connected to a plurality of outlet channels having longitudinal axes which are inclined with respect to the longitudinal axis of the associated inlet channel, said longitudinal axes of the outlet channels being arranged with respect to the associated inlet channel such that they intersect the longitudinal axis of the inlet channel.

In further accordance with the invention, the inlet channel includes a tapered or funnel shaped region connected to the associated plurality of outlet channels and the outlet channels have a collective cross-sectional area which is substantially equal to the cross-sectional area of the tapered region.

By providing the tapered or funnel-shaped constriction in each inlet channel feeding a plurality of outlet channels and by making the collective cross-sectional area of the outlet channels substantially equal to that of the inlet channel, disturbances in the flow of the melt into the outlet channels are avoided which could lead to an uneven flow of the melt.

By arranging the outlet channels at an angle of inclination with respect to the inlet channels, they form a common melt inlet which prevents in-flow disturbances. Thus, in this way, in simple fashion, via only one inlet channel which tapers in funnel shape, a large number of outlet channels can be supplied with melt, so that, with a small inside diameter of the inlet channels, as compared with previously known embodiments, substantially more outlet channels can be arranged. In this regard, the web-like areas remaining at the front surface of the perforated plate have a high moment of resistance to thermal deformations.

In one advantageous embodiment of the invention, the inlet channels are of circular cross-section and the outlet channels have discharge openings disposed in a common outlet plane on a pitch circle whose center is disposed on the longitudinal axis of the associated inlet channel. This permits a large number of outlet channels to be associated in a simple geometrical form with the inlet channels with economical manufacture.

In a further development, in accordance with the invention, the cross-section of the inlet channels is rectangular with semi-circular ends. Consequently, a relatively small channel width can be obtained with thin intermediate webs which makes possible the development of a large number of outlet channels without any loss in strength.

A particularly economical manufacture of the part conveying the plastic melt is obtained by providing insert members incorporating the inlet and outlet channels.

An advantageous limit in the spacing between the discharge outlets of the outlet channels while maintaining a sufficient web thickness between the inlet channels is obtained if the angle of the inlet channels with respect to the outlet channels is between 10 and 20 degrees. The constricting of the outlet channels at their connection with the inlet channels makes possible, in a further development in accordance with the invention, the arrangement thereat of heating channels of sufficiently large cross-sectional area. The constriction provides the free space for the heating channels so that upon heating with a liquid medium, a continuous passage of large cross-section is provided. Upon heating the plastic stream, there is assured a disturbance-free return of the condensate. By annularly surrounding the inlet channels, by the heating channels, an intensive heating of the streams of melt in the outlet region is obtained In this regard, by connecting the annular channels to each other by inclined feed channels a reliable discharge of the condensate can be obtained without backing up of the heating medium.

A particularly economical manufacture of the annular channels is obtained if they are formed in an insert which can be introduced into the perforated plate. The development of the feed channels is also simplified by this construction. As an alternative, when the inlet channels are of rectangular cross-section, the heating channels can extend at opposite ends of the inlet channels and be connected by connecting channels extending between adjacent inlet channels.

Thereby comparably good return-flow action of the condensate is obtained. This results from the inclination of the individual connecting channels, which, although different for each channel, is always present when the perforated plate is disposed vertically during operation.

BRIEF DESCRIPTION OF THE FIGURES OF THE DRAWING

Further advantages and details of the invention will become evident from the following description of preferred embodiments, with reference to the drawing, in which:

FIG. 5 is a cross-sectional view taken along line V—V in FIG. 3;

FIG. 6 is a front view of the inlet region of an individual insert in FIG. 1, shown on a larger scale.

DETAILED DESCRIPTION OF PREFERRED EMBODIMENTS

Figure 1:
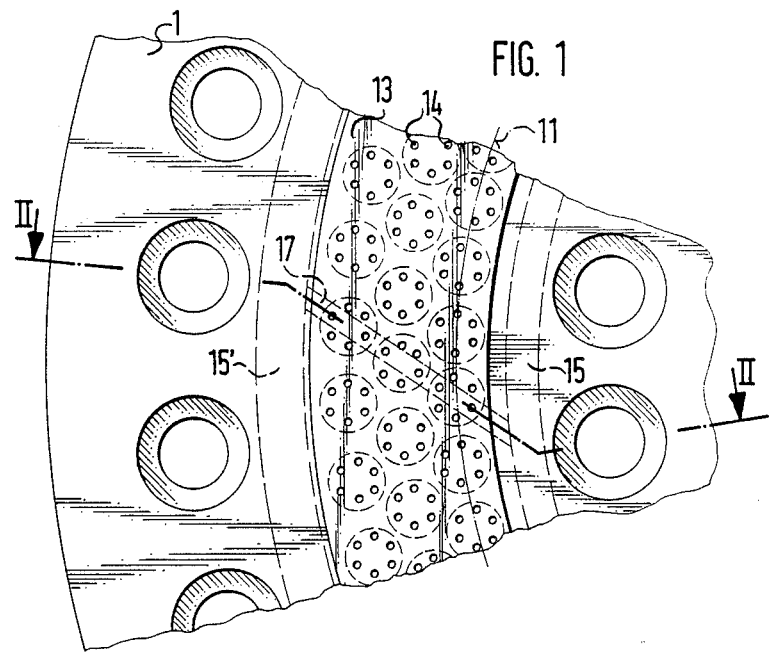
FIG. 1 is a front view at the outlet surface of a portion of a perforated plate having inlet channels provided in cylindrical inserts.
Figure 2:
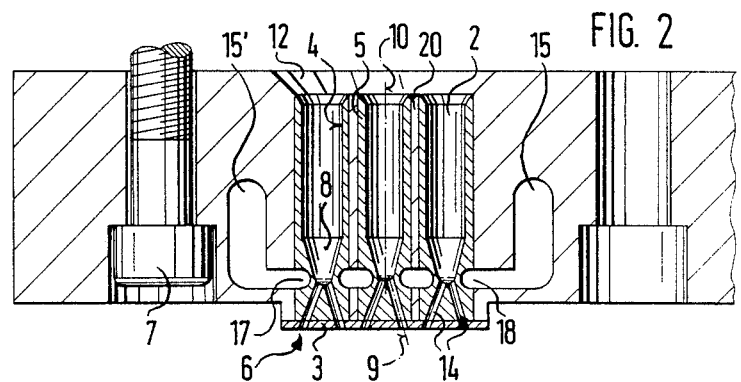
FIG. 2 is a cross-sectional view taken along line II—II in FIG. 1.

In FIGS. 1 and 2, there is shown a portion of a perforated plate construction which comprises a perforated plate 1 connected to an extruder (not shown) by bolts 7. The plate 1 includes an annular cutting region 13 from which strands of plastic are discharged under water against cutting blades (not shown) which divide the strands into pellets. The region 13 of plate 1 has an elevated annular surface 6, which is covered by an anti-wear layer 3 against which the cutting blades are applied tightly.

Inlet channels 2, for the flow of a plastic melt, are in communication with a distributor channel 12. The inlet channels 2 are located on concentric circles 11 located within the annular region 13. In accordance with the first embodiment in FIGS. 1 and 2, the inlet channels 2 are formed individually within a cylindrical insert member 5. Also formed in the cylindrical insert member 5 are a plurality of outlet channels 14 which connect with the inlet channels 2.

Each inlet channel 2 consists of a bore 4 which is arranged concentrically in the cylindrical insert member 5 and which narrows in funnel shape at its end 8. Due to the funnel shape narrowing of the bore 4, the outlet channels 14 are arranged in adjoining overlapping relation to each other such that, as can be seen in FIG. 6, they form a common inlet cross-section whose area corresponds substantially to the outlet cross-sectional area of the inlet channel 2. In this respect, in each case a plurality of outlet channels 14 communicate with a respective funnel shape end of inlet channel 2. For this purpose, the longitudinal axes 9 of the outlet channels 14 are inclined with respect to the longitudinal axis 10 of the inlet channels 2 by an angle which is preferably within the range of 10 to 20 degrees. As shown in FIG. 6, in this way six outlet channels 14 at the front surface of the annular cutting region 13 are obtained for each inlet channel 2. Since the longitudinal axes 9 of the outlet channels are disposed, at the outlet side, on a pitch circle whose center is on the longitudinal axis 10 of the corresponding inlet channel 2, there is sufficient spacing of the discharge outlets of the outlet channels 14 from each other in order to provide individual flow of the strands from the outlet channels while providing adequate material in the region 13 between the channels 14. By virtue of the funnel shape ends 8 of the inlet channels 2, a uniform flow of melt within the inlet channels 2 themselves as well as in each individual outlet channel 14 is obtained. The funnel shape end 8 is dimensioned in accordance with the rheological properties of the plastic melt to be processed and its cone angle is between 30 and 60 degrees. It has been found that in this way, with guidance of the melt into a plurality of outlet channels 14 from a respective single inlet channel 2, disturbances in the flow into the outlet channels are reliably prevented. The association of a plurality of outlet channels 14 with one respective inlet channel 2, i.e. the bundling of channels 14 within cylindrical insert member 5, makes possible, with relatively small spacing of the insert members 5, the provision of a large number of outlet channels 14.

Furthermore, the perforated plate 1 can be heated in the region of its front surface as shown in FIGS. 1 and 2 by the provision of heating channels 15 and 15' arranged, in the region of the constriction of the outlet channels 14, at the outer periphery of the cylindrical insert members 5. The heating channels are connected by feed channel 17 to annular channels 18 which are formed as annular recesses in the outer surface of the cylindrical insert members 5.

The annular channels 18 and the feed channels 17 are located directly at the inflow region of the outlet channels 14 so that an intensive comprehensively uniform heating of the outlet channels 14 is effected in this region.

The feed and discharge of the heating fluids such as, steam and its condensate via the heating channels 15, 15' to and from the annular channels 18 is effected through the feed channels 17, which extend perpendicularly to the longitudinal axes 10 of the inlet channels 2 and are connected to the annular channels 18, the channels 17 and recesses 18 being disposed in a common plane.

Since the longitudinal axes of the cylindrical insert members 5 lie on concentric pitch circles 11, the annular channels 18 of the cylindrical insert members 5 are arranged adjacent to each other in rows and are staggered with respect to each other in a plane so that they are joined by feed channels 17 which extend along a straight line passing through the longitudinal axes 10 of the inlet channels 2 (see FIG. 1).

In this way, with a vertical position of the perforated plate 1 in the plane of the drawing of FIG. 1, a constant gradient is obtained for the feed channels 17. In this way, condensate which forms can continuously flow away.

Figure 4:
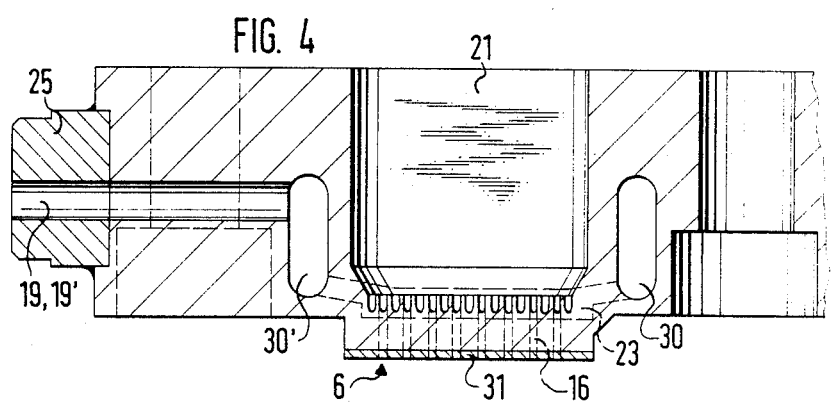
FIG. 4 is a cross-sectional view taken along line IV—IV in FIG. 3.

The feed channels 17 are supplied with the heating fluid from the heating channels 15, 15' which in turn have been fed from openings 19, 19', as shown in FIG. 4. The favorable arrangement of the heating channels 15, 15' in the region of the constriction of the outlet channels 14 permits the development of annular channels 18 and feed channels 17 of relatively large cross-section, so that no accumulation of condensate takes place. The spacing of the cylindrical insert members 5 from each other can also be kept small by the formation of relatively thin webs 20, which nevertheless provide sufficient strength for the plate in region 13.

Figure 3:
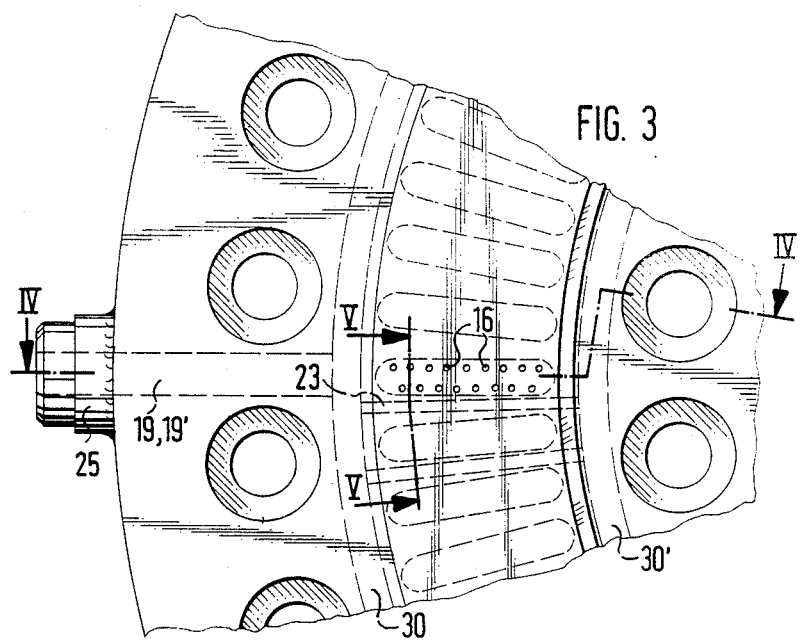
FIG. 3 is a view similar to FIG. 1 of a modified embodiment of a perforated plate having inlet channels of rectangular cross-section.

In a further development, the perforated plate shown in FIGS. 3 and 4 has inlet channels 21 in the form of a pocket or chamber of rectangular shape having semicircular ends. The inlet channels 21 each narrows in funnel shape at its end, from which a plurality of outlet channels 16 extend within the annular region 6. As shown in FIG. 5, the outlet channels 16 have longitudinal axes 9 inclined with respect to the central longitudinal plane 22 of the corresponding inlet channel 21.

It is evident that in this arrangement also, heating channels 23 can be dimensioned with sufficiently large cross-section within the region of the constriction of the outlet channels 16 with formation of a web 24 of adequate size between adjacent channels. Without any reduction in strength, the web 24 can be made sufficiently narrow so that a large number of outlet channels 16 can be provided for each perforated plate. The plastic melt, which in this case also flows via distributor channel 12 into the inlet channels 21, is fed, via the funnel shape constriction of each inlet channel 21 to all outlet channels 16 with a uniform flow. The transport of the heating fluid into the heating channels 23 provided at the front side of the perforated plate and the discharge of the condensate which is formed are effected through annular surrounding channels 30, 30' via feed and discharge openings 19, 19' which are provided with a connection socket 25. The annular surface 6 is also covered with an anti-wear layer 31.

Figure 7:
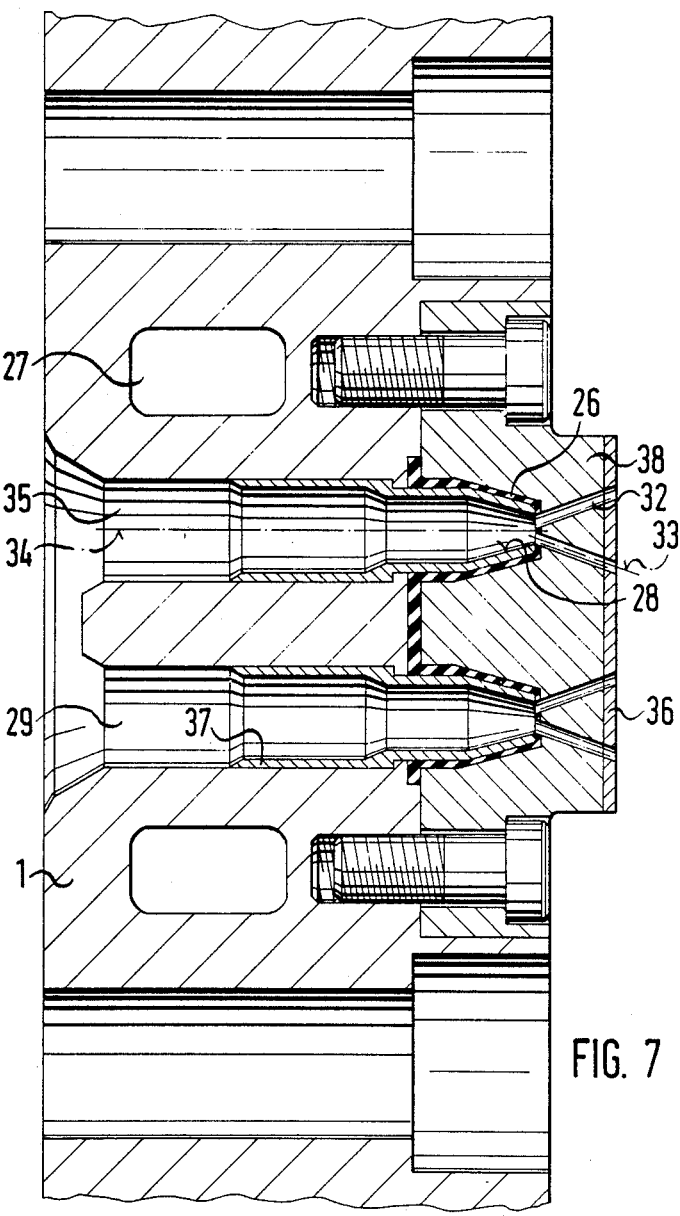
FIG. 7 is a sectional view showing a further embodiment of a perforated plate having insulation means surrounding a plurality of adjacent inlet channels.

FIG. 7 shows the perforated plate 1 in a different construction in accordance with the invention. Therein the inlet channels 35 are surrounded by a continuous insulating layer 26 which prevents loss of heat at the cooled cutting plate 38. The heating of the perforated plate 1 is not effected in this embodiment at the outlet side of the plastic melt in the cutting region 38 but rather at the inlet region of the inlet channels 35 in cylindrical inserts 37. For this purpose heating channels 27 are provided around the inlet channels 35 as shown in FIG. 7.

The inlet channels 35 are formed by the cylindrical inserts 37 which are placed in corresponding holes 29 in the perforated plate 1. Each individual insert 37 narrows in funnel shape at the outlet side and communicates with a plurality of outlet channels 32 whose longitudinal axes 33 are inclined with respect to the longitudinal axis 34 of the corresponding inlet channel 35 and of the cylindrical insert 37.

The inserts 37 can be made of a heat-conductive metal alloy, for instance a copper alloy.

With this construction, the outlet channels 32 are of relatively short length without reduction of the strength of the cutting plate 38 so that the funnel shaped ends 28 of the inlet channels 35, and thus the uniform temperature field in this region due to the continuous insulating layer 26, can be extended in each case close to the surface of the cutting region 38. By the relatively short length of bore of the outlet channels 32 a considerable reduction in the pressure drop within the outlet channels 32 is obtained.

The construction of the perforated plates makes possible, in the inlet channels 2, 21, 35 and the outlet channels 14, 16, 32, a substantially disturbance-free flow of the melt with uniform heating of the melt strands by the feed channels 17 and annular channels 18 which can be of sufficient cross-section for conducting the heating fluids. The perforated plates are suitable for particular use for example, with highly viscous types of polyethylene and polypropylene melts.

Although the invention has been described in relation to the specific embodiments thereof it will become apparent to those skilled in the art that numerous modifications and variations can be made within the scope and spirit of the invention as defined in the attached claims

What is claimed is:

1. A perforated plate construction for the underwater granulating of plastic strands comprising a plate, means providing in said plate a plurality of inlet channels for supply of plastic material thereto and a plurality of outlet channels from which strands of the plastic material can be discharged from the plate for underwater granulation, and heat exchange means surrounding at least a portion of said inlet channels for effecting heat exchange with the plastic material flowing therein, each inlet channel being connected to a plurality of outlet channels, said outlet channels having longitudinal axes which are inclined with respect to longitudinal axes of the associated inlet channels, said longitudinal axes of the outlet channels being arranged with respect to eh associated inlet channel such that they intersect the longitudinal axis of the inlet channels, said plurality of said outlet channels diverging from their intersection with the longitudinal axis of the respective inlet channel in the direction of material flow at an angle of inclination of 10° to 20°, said inlet and outlet channels being confined within said plate, said plate having a planar cutting surface at which said outlet channels have discharge openings such that a cutting means is able to granulate plastic strands discharged from said discharge openings, each inlet channel having a tapered region connected to the associated plurality of outlet channels, said outlet channels having a collective cross-sectional area which is substantially equal to the cross-sectional area of said tapered region.

2. A perforated plate construction as claimed in claim 1 wherein said inlet channel have circular cross-sections, said discharge openings of said outlet channels being disposed on a pitch circle having a center disposed on the longitudinal axis of the associated inlet channel.

3. A perforated plate construction as claimed in claim 1 wherein said inlet channels have rectangular cross-sections and a longitudinal plane of symmetry, said discharge openings of said outlet channels being arranged in spaced alternate relation on two parallel lines on opposite sides of said longitudinal plane of symmetry.

4. A perforated plate construction as claimed in claim 1 wherein said means which provided said inlet channels comprises insert members in respective bores provided in said plate, each insert member defining a respective inlet channel.

5. A perforated plate construction as claimed in claim 4 wherein said insert members have end surfaces which are flush with said planar cutting surface of said plate.

6. A perforated plate construction as claimed in claim 5 wherein said outlet channels are provided in said insert members.

7. A perforated plate construction as claimed in claim 1 wherein said heat exchange means comprises fluid supply channels in said plate, annular channels surrounding respective inlet channels and feed channels connecting said fluid supply channel and said annular channels, said feed channels extending in a plane perpendicular to the longitudinal axes of said inlet channels.

8. A perforated plate construction as claimed in claim 7 wherein said annular channels of said heat exchange means surround the respective inlet channels in the region of the connection thereof to said outlet channels 9. A perforated plate construction as claimed in claim 8 wherein each feed channel is connected to a plurality of annular channels, said inlet channels and said annular channels surrounding the same being arranged in rows and being staggered in adjacent rows, said feed channels extending along lines passing through the longitudinal axes of associated inlet channels in adjacent rows.

10. A perforated plate construction as claimed in claim 9 wherein said means which provides said inlet channels comprises insert members in respective bores provided in said plate, each insert member defining a respective inlet channel, said annular channels being formed as annular recesses in said insert members.

11. A perforated plate construction as claimed in claim 10 wherein said fluid supply channels extend parallel to the rows of inlet channels.

12. A perforated plate construction as claimed in claim 3 wherein said heat exchange means comprises two fluid supply channels in said plate extending in a plane perpendicular to said inlet channels at opposite sides thereof and connecting channels connected to the fluid supply channels and extending cross-wise between adjacent inlet channels.

13. A perforated plate construction as claimed in claim 12 wherein said inlet channels are arranged in an annular array in said plate, said connecting channels extending radially with respect to the annular array of said inlet channels.

14. A perforated plate construction as claimed in claim 13 wherein said connecting channels extend in the region of the connection of said inlet channels to said outlet channels.

15. A perforated plate construction as claimed in claim 1 wherein said inlet and said outlet channels are arranged in annular array in said plate.

* * * * *